(12) United States Patent
Winter

(10) Patent No.: US 10,328,466 B2
(45) Date of Patent: Jun. 25, 2019

(54) DEVICE FOR FACILITATING GRILL GRATE CLEANING

(71) Applicant: Michael R Winter, Billerica, MA (US)

(72) Inventor: Michael R Winter, Billerica, MA (US)

(*) Notice: Subject to any disclaimer, the term of this patent is extended or adjusted under 35 U.S.C. 154(b) by 284 days.

(21) Appl. No.: 15/373,994

(22) Filed: Dec. 9, 2016

(65) Prior Publication Data

US 2018/0161822 A1  Jun. 14, 2018

(51) Int. Cl.
   *B08B 1/00* (2006.01)
   *B08B 7/02* (2006.01)
   *B08B 3/04* (2006.01)
   *A47J 37/07* (2006.01)

(52) U.S. Cl.
   CPC ........... *B08B 1/005* (2013.01); *A47J 37/0786* (2013.01); *B08B 1/002* (2013.01); *B08B 3/04* (2013.01); *B08B 7/02* (2013.01)

(58) Field of Classification Search
   CPC ... B08B 1/005; B08B 3/04; B08B 7/02; A47J 37/0786
   See application file for complete search history.

(56) References Cited

U.S. PATENT DOCUMENTS

| | | | | |
|---|---|---|---|---|
| 7,086,117 | B2* | 8/2006 | Lann .................... | A47J 37/0786 15/236.06 |
| 7,743,452 | B1* | 6/2010 | Tcholakov ............... | A46B 7/06 15/167.1 |
| 9,403,261 | B2* | 8/2016 | Weinberger ............ | B24D 15/02 |
| 2007/0270088 | A1* | 11/2007 | Greenwood ............ | B24B 23/04 451/73 |

* cited by examiner

*Primary Examiner* — Shay Karls
(74) *Attorney, Agent, or Firm* — Mark C. Johnson; Johnson |Dalal

(57) ABSTRACT

The invention claims a device for facilitating the effective cleaning of grill grates by taking the exact shape of the grill grate itself. This is possible doe to a large number of small diameter pins that move independently of each other. When pressed against the grill grate the pins m contact with the grate itself will be displaced upward and the pins in between the grates will move downward. This movement allows the device to take the exact shape of each individual grate. When the device takes the shape of the grate it can easily be locked in place allowing effective scraping of the grates. When finished scraping one particular size and shape grate the device can easily be unlocked and placed on a flat surface to even out the pins, then placed on another grate of a completely different shape and size, pressed down, have it take the exact shape, lock in place and effectively scrape this grate. This can be repeated over and over for most any shape or size grill grate.

20 Claims, 5 Drawing Sheets

DEVICE FOR FACILITATING GRILL GRATE CLEANING

FIELD OF THE INVENTION

The present invention relates to the field of grill cleaning devices. The invention herein relates more particularly to a device that conforms and adapts to multiple grill grate sizes and shapes.

BACKGROUND OF THE INVENTION

Backyard grilling has become very common throughout the world and keeping the grate clean is important. There are many grill grate cleaning devices available to the backyard griller and most of them do a pretty good job. One common grid grate cleaning device is a wire brush. This device can be a health hazard if the small wires break loose from the device and get deposited on the grate itself. These small wires can get picked up and stuck on the food that is being grilled, completely undetected. Because the wires are stuck on the food and undetected they are easily ingested and can become a health hazard. There are many documented cases of ingestion and illness due to this.

This device that is the subject of this invention helps to eliminate this problem by having larger, stiffer pins taking the exact shape of the grill and lock in place. The wire brush relies on the small diameter wires radically bending to take die shape of the grate. The individual wires become work hardened and brittle because of the back and forth motion of cleaning. The wires become brittle and break loose getting deposited on the grill grate. Because they are small, they go undetected.

Since the invented device's pins are of a larger diameter than a wire brash and do not bend during the scraping/cleaning process, it is not likely that they will break off and go undetected.

Existing methods of scraping/cleaning grill grates using either adjustable or formable scrapers are:

Grill Rack Cleaning Device: that is laterally adjustable, using tools to loosen and tighten individual friction locks. The clips are a predetermined shape that must be installed individually. They will clean a particular grill grate shape, but will not take the exact shape of a multitude of grill grates without the use of tools.

Adjustable Grill Scraper: that can be adjusted laterally with the use of tools to loosen and tighten individual friction locks for each grate. These are designed to clean grates that have different spacing however; there is no natural conformity to the grill grate for intimate cleaning of a variety of shapes and sixes of grill grate.

Heat Responsive Wood Scraper: that will take the shape of the grill grate. This method requires "burning" the shape of the grill grate into the end of the wood scraper by heating the grill to high heat and scraping the end of the paddle on the hot grill grates until the shape is worn in. This scraper will take the shape of the grate but is only good for that particular grate.

The inventor is not aware of any prior grill scraper/cleaner that uses something similar to the subject of this application.

There are multiple variations of the three approaches discussed above. Representative prior art is cited as Lann 708,611,7 (Cylindrical Clip), Hall 572,007,1 Rood 525, 540,6 (Adjustable Grill Scraper), Thompson 874,106,8 (Meat Responsive Wood Scraper).

DETAILED DESCRIPTION OF THE INVENTION

The invention claims a device for effectively scraping grill grates clean by easily taking the exact shape of each individual grate due to the use of pins that move independently of each other and are then locked into place. The invention claims the device can withstand lateral and vertical loads applied to effectively clean burnt food from the grill grate. The invention claims feat it can be used on most any grill grate shape and size. The invention claims once the shape has been formed it is easily locked in place without the use of tools. The invention claims the device can be locked and unlocked many times, without the use of tools, making it possible to be used on a multitude of different grill grates of different sizes and shapes. The invention claims the device can also be used for scraping/cleaning flat top surfaces.

Figure 1:
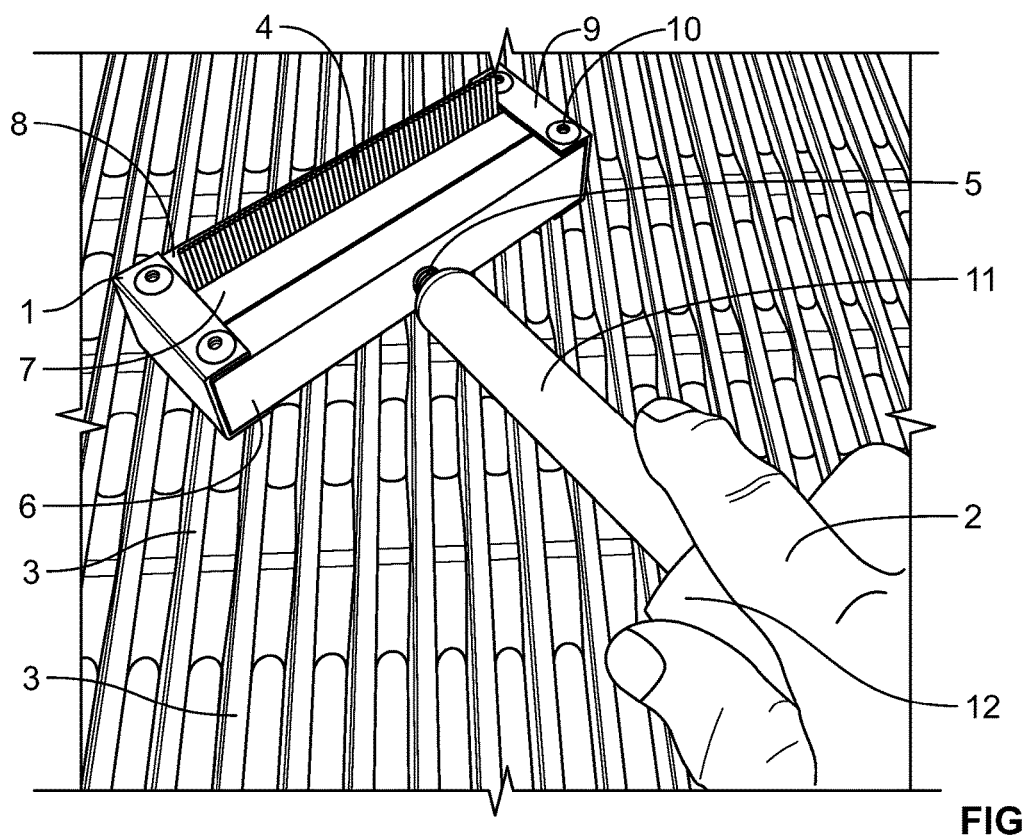
FIG. 1 is an illustration of an exemplary Device for Facilitating Grill Grate Cleaning in a neutral or starting position or for scraping a flat surface.
Figure 2:
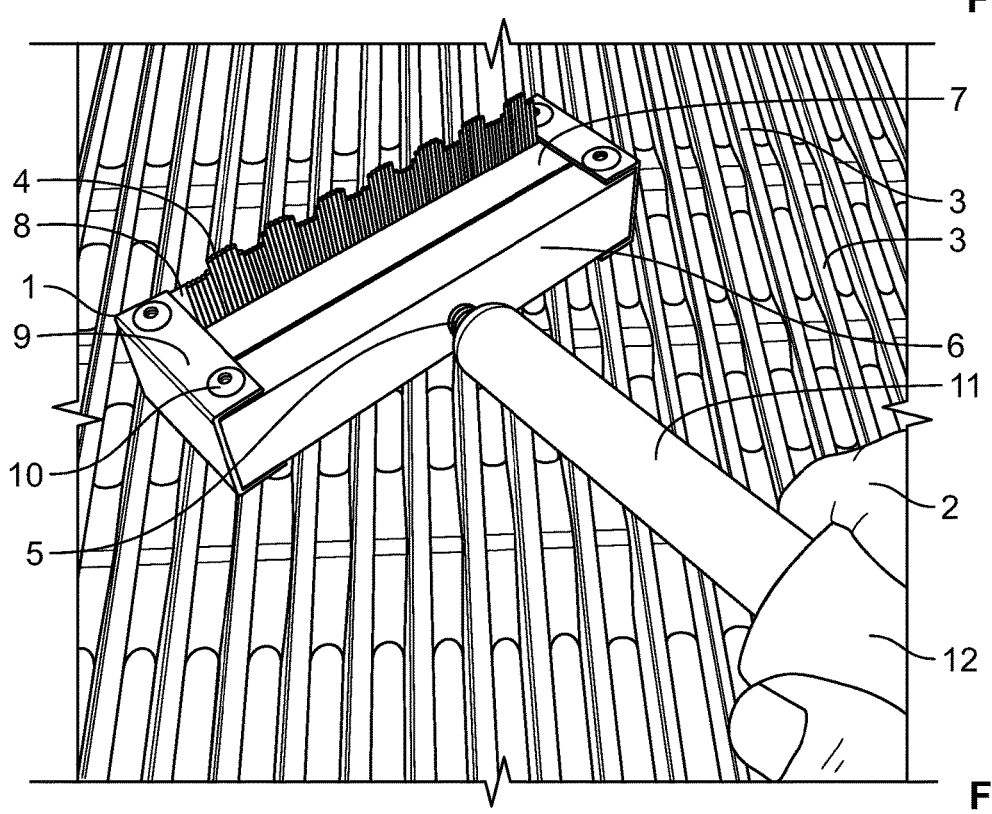
FIG. 2 is an illustration of the claim that the device can take the shape of the grill grate.
Figure 7:
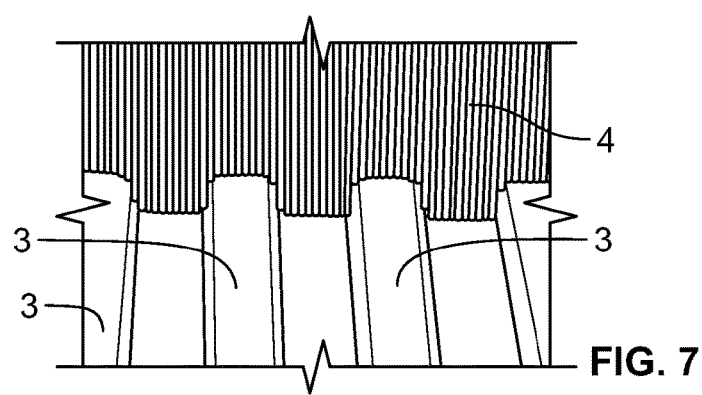
FIG. 7 is an illustration of the device taking the shape of a square grill grate.
Figure 8:
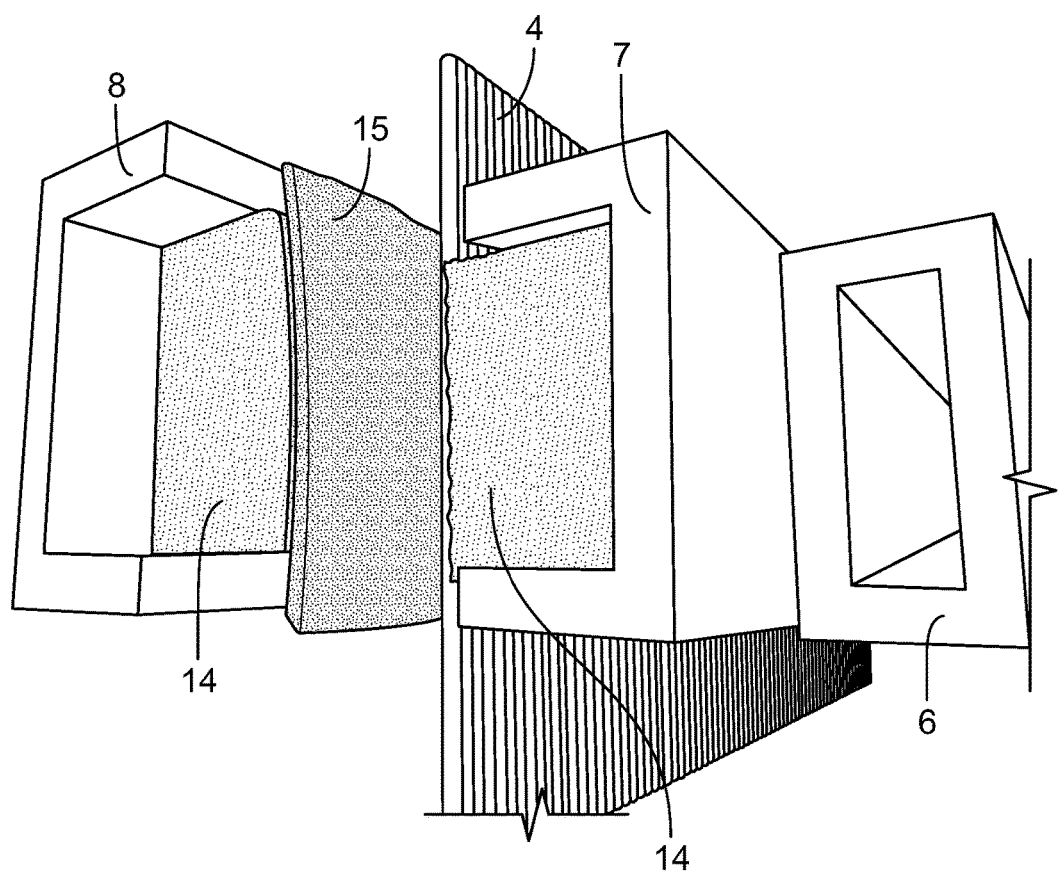
FIG. 8 is an illustration of the inside of die device that aids in the operation

As best seen in FIGS. 1-2 and FIG. 8, a device 1 for facilitating grill grate cleaning is shown having a grate cleaning head that includes a frame assembly with the stationary beams 6, 8, the end caps 9 (that can be seen of a U-shape), the movable beam 7 interposed between the two stationary beams 6, 8. The device 1 includes a handle 1 land a plurality of pins 4 that, as discussed above, are each of a substantially stiff material and operably configured to move vertically in the grate cleaning head. With specific reference to FIG. 8, the pins 4 can be seen having a first end, a second end opposing the first end, and a pin length separating the first and second ends. The plurality of pins 4 may be compressively retained along each of their respective pin lengths in a tightly-spaced, parallel, and single row configuration by the grate cleaning head (seen in FIGS. 1-8). The plurality of pins 4 may be cylindrical and are operably configured to have a neutral position (shown best in FIGS. 1-2) along a pin translation path and a locked position (shown best in FIG. 3) along the pin translation path with the first ends of the plurality of pins 4 vertically displaced with respect one another for contouring a grill grate. As shown best in FIGS. 1 and 8, the neutral position along the pin translation path includes the first and second ends of the plurality of pins vertically configured in substantially planar orientation with respect to one another. As discussed above, a neutral position also includes moving the pins 4 when the device 1 is pressed down on the grate (3) in a natural fashion similar to measuring contours. The user or operator 2 may rotate the handle 11 counterclockwise (i.e., a first direction) to place the pins 4 in a neutral position and have the pin translation path. Then, when desired to lock the pins 4, the user or operator 2 will then rotate the handle 11 clockwise (i.e., a second direction opposite the first direction) to move the movable beam 7 to compress the pins 4. Said another way, the movable beam 7 is operably configured to translate within the cleaning head and compress the plurality of pins 4 in the locked position. To effectuate the same, the handle with a screw fastener (also referred to herein as a jackscrew 5) coupled to the stationary beams 6 and the movable beam 7 in a threaded configuration. As can be seen best in FIGS. 2-3, the plurality of pins 4 are operably configured to independently move in a perpendicular direction with respect to an axis of elongation of the handle 11. As can be seen best in FIGS. 2 and 8, the plurality of pins 4 are also operably configured to move vertically in and through the top end and bottom end of the grate cleaning head and have a portion of the pin length disposed above and below the top and bottom ends of the grate cleaning head, respectively.

Figure 3:
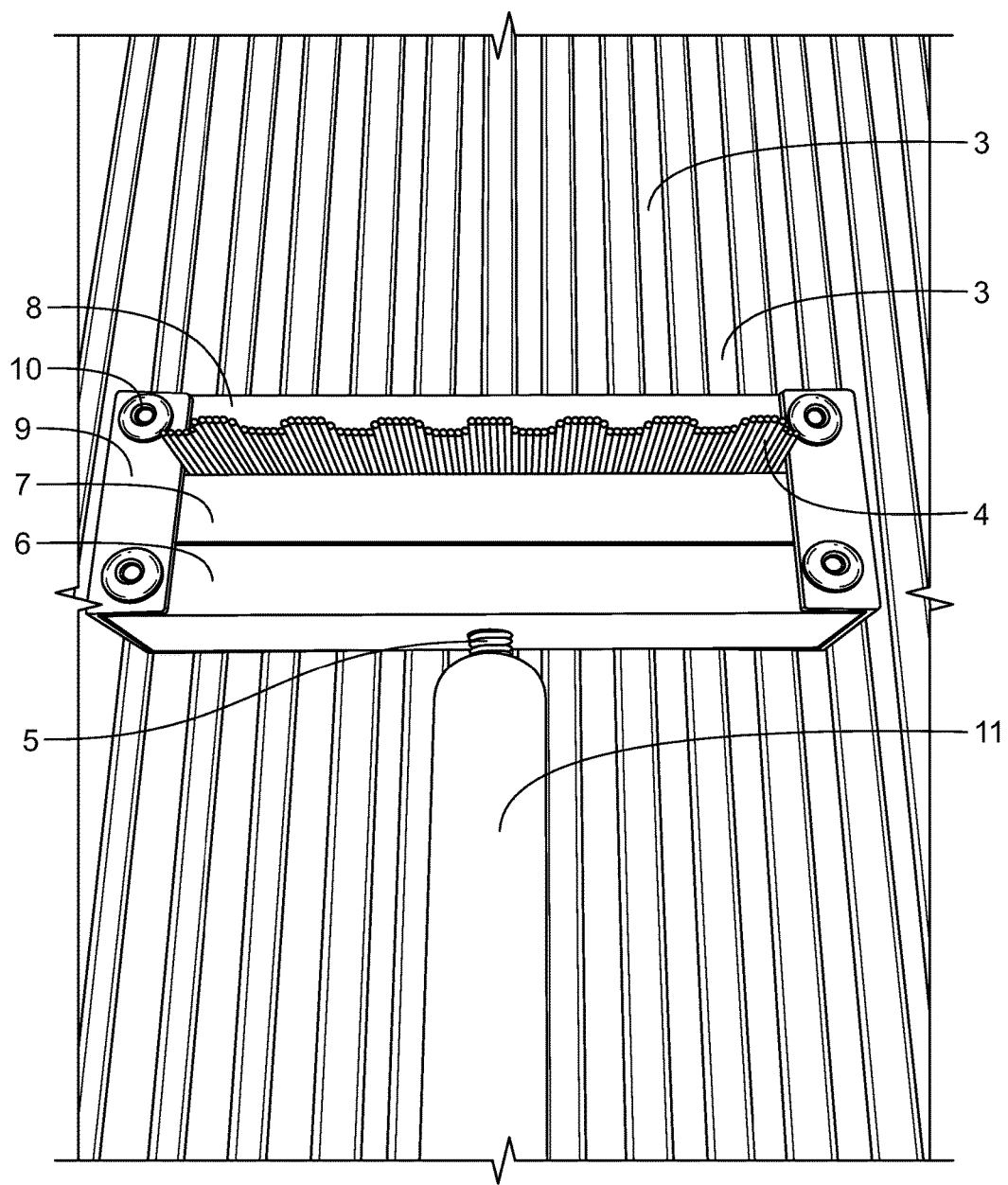
FIG. 3 is an illustration of the detail associated with FIG. 1 and FIG. 2.
Figure 4:
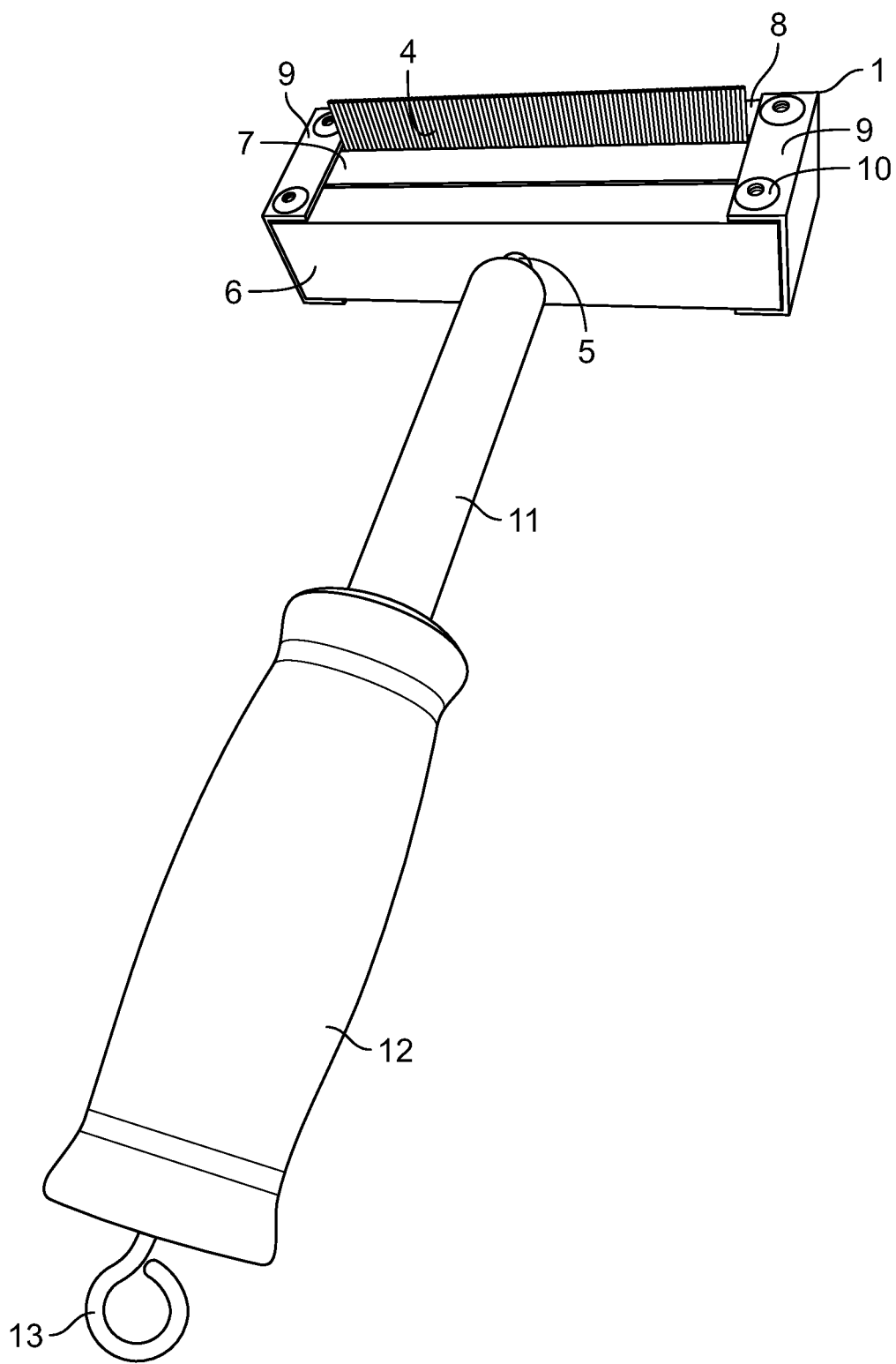
FIG. 4 is an illustration of die device in its entirety.
Figure 5:
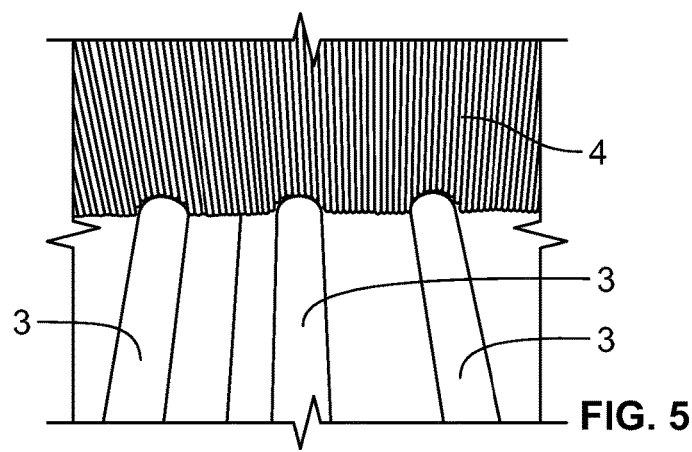
FIG. 5 is an illustration of device taking the shape of a round grill grate.
Figure 6:
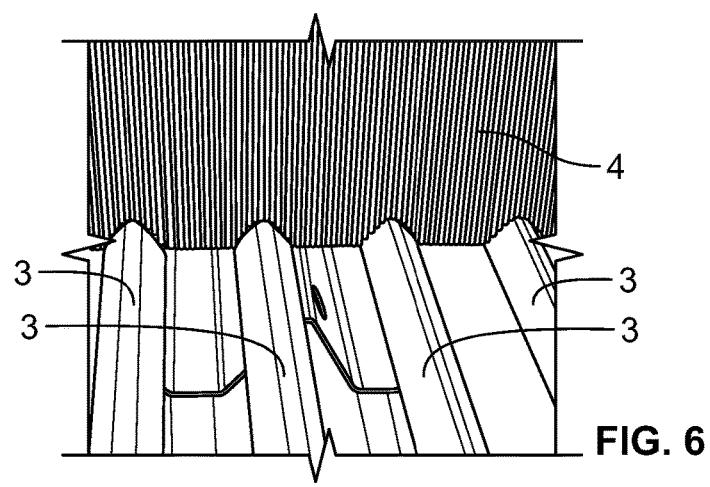
FIG. 6 is an illustration of the device taking the shape of a triangular grill grate shape.

In this embodiment, the device (1) (FIG. 1) enables the operator (2) (FIG. 1) holding the device to press the device down on the grate (3) (FIG. 1) in a natural fashion similar to measuring contours while the handle (11) (FIG. 1) and jackscrew (5) (FIG. 1) has been turned counterclockwise allowing the pins (4) (FIG. 1) to move freely. Contact between the individual pins and the grate and non-contact of the pins in between the grates coupled with the individual movement of the pins allows the device to mirror the shape of the grate (3) (FIG. 2). The pins (4) (FIG. 2) are prevented from falling out of the device (1) (FIG. 1) while adjusting to the grate (3) (FIG. 2) by the resilient material (14) (FIG. 8) and slip resistant material (15) (FIG. 8) being compressed together against the pins (4) (FIG. 8), no matter what position of the handle (11) (FIG. 1) and jackscrew (5) (FIG. 1) by way of a predetermined setting. Locking the pins (4) (FIG. 3) in place by turning the handle (11) (FIG. 3) clockwise will hold the pins to the exact shape of the grate while lateral and vertical force is applied for effective cleaning. The pins (4) (FIG. 2) are of a large enough diameter and stiff enough material to prevent bending and separating when lateral and vertical force is applied while cleaning grill grates or flat tops. The grill scraper (1) (FIG. 4) includes a dual purpose handle (11) (FIG. 4). Turning the handle (11) (FIG. 4) clockwise forces the movable beam (7) (FIG. 4) against the pins (4) (FIG. 4) and the pins against a stationary beam (8) (FIG. 4) and slip resistant material (15) (FIG. 8) locking the pins in place with friction. The handgrip (12) (FIG. 4) is for comfort and better grip while turning the handle (11) (FIG. 4) to lock or unlock the pins (4) (FIG. 4). An eye/loop component (13) (FIG. 4) is for hanging/storing the scraper while not in use. A jackscrew (5) (FIG. 3) is anchored into the handle (11) (FIG. 4) and threaded into and through a stationary beam (6) (FIG. 3), and contacts a movable beam (7) (FIG. 3). The stationary beam (8) (FIG. 3), threaded stationary beam (6) (FIG. 3) and movable beam (7) (FIG. 3) are held in place by end caps (9) (FIG. 3), and fasteners (10) (FIG. 3), FIGS. 5, 6 & 7 are illustrations of the ability of the device to take the exact shape of various grill grates.

Multiple additional features are envisioned for the device. The device can include one of many methods for attachments: a container for cleaning agent, light, vibrating mechanism, debris guard, magnet, air channel, brush attachment, mesh attachment abrasive pad attachment.

This device could make grill and flat top scraping and cleaning safer and more effective for professional barbeque grillers and restaurant users as well as backyard grillers.

What is claimed is:

1. A device for facilitating grill grate cleaning comprising:
    a grate cleaning head having a plurality of pins each of a substantially stiff material, operably configured to move vertically in the grate cleaning head, having a first end, having a second end opposing the first end, and having a pin length separating the first and second ends, the plurality of pins compressively retained along each of their respective pin lengths in a tightly-spaced, parallel, and single row configuration by the grate cleaning head.

2. The device for facilitating grill grate cleaning according to claim 1, wherein:
    the plurality of pins are operably configured to have a neutral position along a pin translation path and a locked position along the pin translation path with the first ends of the plurality of pins vertically displaced with respect one another for contouring a grill grate.

3. The device for facilitating grill grate cleaning according to claim 2, wherein:
    the neutral position along the pin translation path includes the first and second ends of the plurality of pins vertically configured in substantially planar orientation with respect to one another.

4. The device for facilitating grill grate cleaning according to claim 2, wherein the grate cleaning head further comprises:
    a frame assembly having two stationary beams coupled together with two end caps and having a movable beam interposed between the two stationary beams, wherein the movable beam is operably configured to compress the plurality of pins in the locked position.

5. The device for facilitating grill grate cleaning according to claim 4, wherein:
    the two end caps are of a U-shape with the movable beam disposed and operably configured to translate therein.

6. The device for facilitating grill grate cleaning according to claim 4, wherein the grate cleaning head further comprises:
    a slip resistant material interposed between at least one of the two stationary beams and the plurality of pins, the slip resistant material directly coupled and frictionally retaining the plurality of pins.

7. The device for facilitating grill grate cleaning according to claim 6, further comprising:
    a handle with a screw fastener coupled to one of the two stationary beams and the movable beam in a threaded configuration.

8. The device for facilitating grill grate cleaning according to claim 7, wherein:
    the handle is operably configured to rotate in a first direction and operably translate the movable beam to compress the plurality of pins in the locked position.

9. The device for facilitating grill grate cleaning according to claim 8, wherein:
    the handle is operably configured to rotate in a second direction, opposite the first direction of rotation of the handle, and operably translate the movable beam to place the plurality of pins in the neutral position along the pin translation path.

10. The device for facilitating grill grate cleaning according to claim 1, wherein:
    the plurality of pins are cylindrical.

11. A device for facilitating grill grate cleaning comprising:

a handle with a screw fastener coupled thereto; and a grate cleaning head having a frame assembly with two stationary beams coupled together and with a movable beam interposed between the two stationary beams and coupled to the screw fastener of the handle, the grate cleaning head having a plurality of pins each:

of a substantially stiff material;

having a first end, a second end opposing the first end, and a pin length separating the first and second ends;

operably configured to move within the grate cleaning head and have a neutral position along a pin translation path and have a locked position along the pin translation path with the first ends of the plurality of pins vertically displaced with respect one another and compressively retained along each of their respective pin lengths by at least one of the two stationary beams and the movable beam for contouring a grill grate.

12. The device for facilitating grill grate cleaning according to claim 11, wherein:

the neutral position along the pin translation path includes the first and second ends of the plurality of pins vertically configured in substantially planar orientation with respect to one another.

13. The device for facilitating grill grate cleaning according to claim 11, wherein:

the plurality of pins are disposed in a tightly-spaced and parallel configuration with respect to one another.

14. The device for facilitating grill grate cleaning according to claim 13, wherein:

the plurality of pins are disposed in a single row configuration with respect to one another.

15. The device for facilitating grill grate cleaning according to claim 11, wherein:

the plurality of pins are operably configured to independently move in a perpendicular direction with respect to an axis of elongation of the handle.

16. The device for facilitating grill grate cleaning according to claim 11, wherein:

the two stationary beams of the frame assembly are coupled together with two end caps of a U-shape.

17. A device for facilitating grill grate cleaning comprising:

a handle; and a grate cleaning head coupled to the handle and having:

a top end and a bottom end opposing the top end; and a plurality of pins each of a substantially stiff material, operably configured to move vertically in and through the top end and bottom end of the grate cleaning head, having a first end, having a second end opposing the first end, and having a pin length separating the first and second ends and having a portion of the pin length disposed above and below the top and bottom ends of the grate cleaning head, respectively, the plurality of pins compressively retained along each of their respective pin lengths.

18. The device for facilitating grill grate cleaning according to claim 17, wherein:

the plurality of pins are disposed in a tightly-spaced, parallel, and single row configuration by the grate cleaning head.

19. The device for facilitating grill grate cleaning according to claim 18, wherein the grate cleaning head further comprises:

a frame assembly with two stationary beams coupled together and with a movable beam interposed between the two stationary beams and coupled to a screw fastener coupled to an end of the handle.

20. The device for facilitating grill grate cleaning according to claim 18, wherein:

the plurality of pins are operably configured have a neutral position along a pin translation path and have a locked position along the pin translation path with the first ends of the plurality of pins vertically displaced with respect one another and compressively retained along each of their respective pin lengths by at least one of the two stationary beams and the movable beam.

* * * * *